United States Patent [19]
Haluda et al.

[11] Patent Number: 5,114,183
[45] Date of Patent: May 19, 1992

[54] RECREATIONAL VEHICLE FRAME

[75] Inventors: Raymond Haluda, Elkhart; Ramon Michen, Mishawaka, both of Ind.

[73] Assignee: Coachmen Industries, Inc., Elkhart, Ind.

[21] Appl. No.: 585,320

[22] Filed: Sep. 19, 1990

[51] Int. Cl.[5] .................. B62D 21/00; B62D 21/11
[52] U.S. Cl. ............................. 280/781; 280/788; 280/800; 280/723
[58] Field of Search ............ 280/781, 791, 795, 786, 280/788, 797, 800, 790, 700, 701, 660, 664, 721, 722, 723, 709; 267/217, 273

[56] References Cited

U.S. PATENT DOCUMENTS

| | | | |
|---|---|---|---|
| 2,730,375 | 1/1956 | Reimspiess et al. | 280/664 |
| 2,794,650 | 6/1957 | Schilberg | 280/790 |
| 3,356,386 | 12/1967 | Taylor | 280/788 |

FOREIGN PATENT DOCUMENTS

| | | | |
|---|---|---|---|
| 2930036 | 2/1981 | Fed. Rep. of Germany | 280/781 |
| 1114753 | 5/1968 | United Kingdom | 280/700 |
| 2209715 | 5/1989 | United Kingdom | 280/795 |

*Primary Examiner*—Charles A. Marmor
*Assistant Examiner*—Paul Dickson
*Attorney, Agent, or Firm*—James D. Hall

[57] ABSTRACT

A frame for a recreational vehicle wherein the rear frame section is dropped or offset relative to the front frame section. The drop frame permits a recreational vehicle body carried by the frame to have a ample inside head room with a smaller outside profile. A pair of substantially vertical shock absorbers extend between frame connected shock towers and torsion bar connected wheel carrying pivot arms.

4 Claims, 4 Drawing Sheets

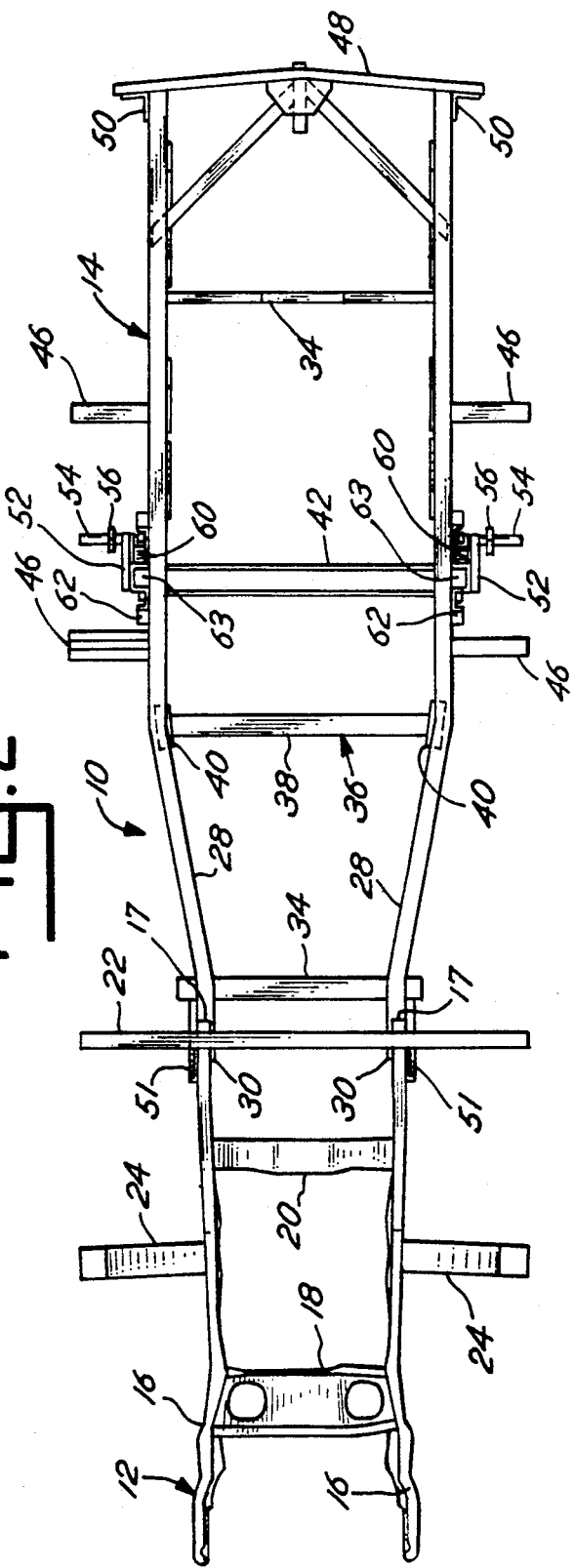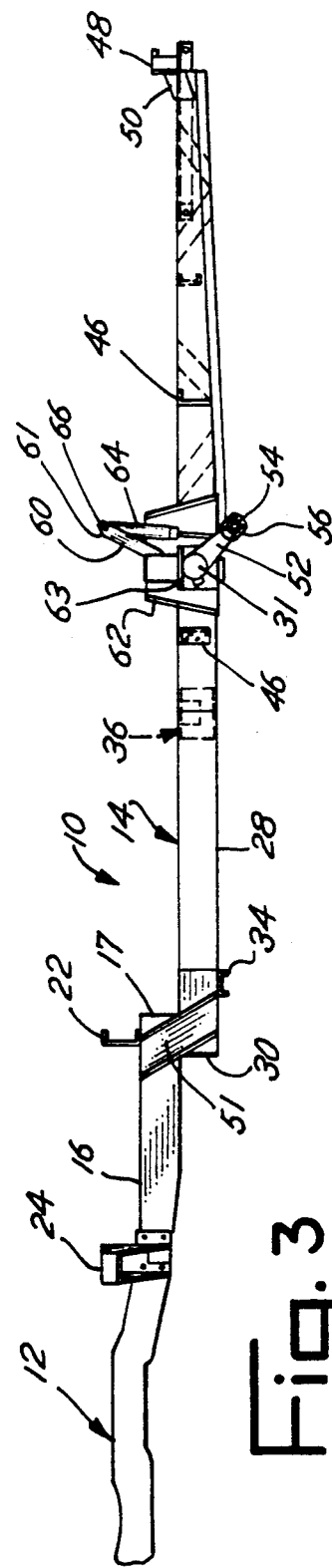

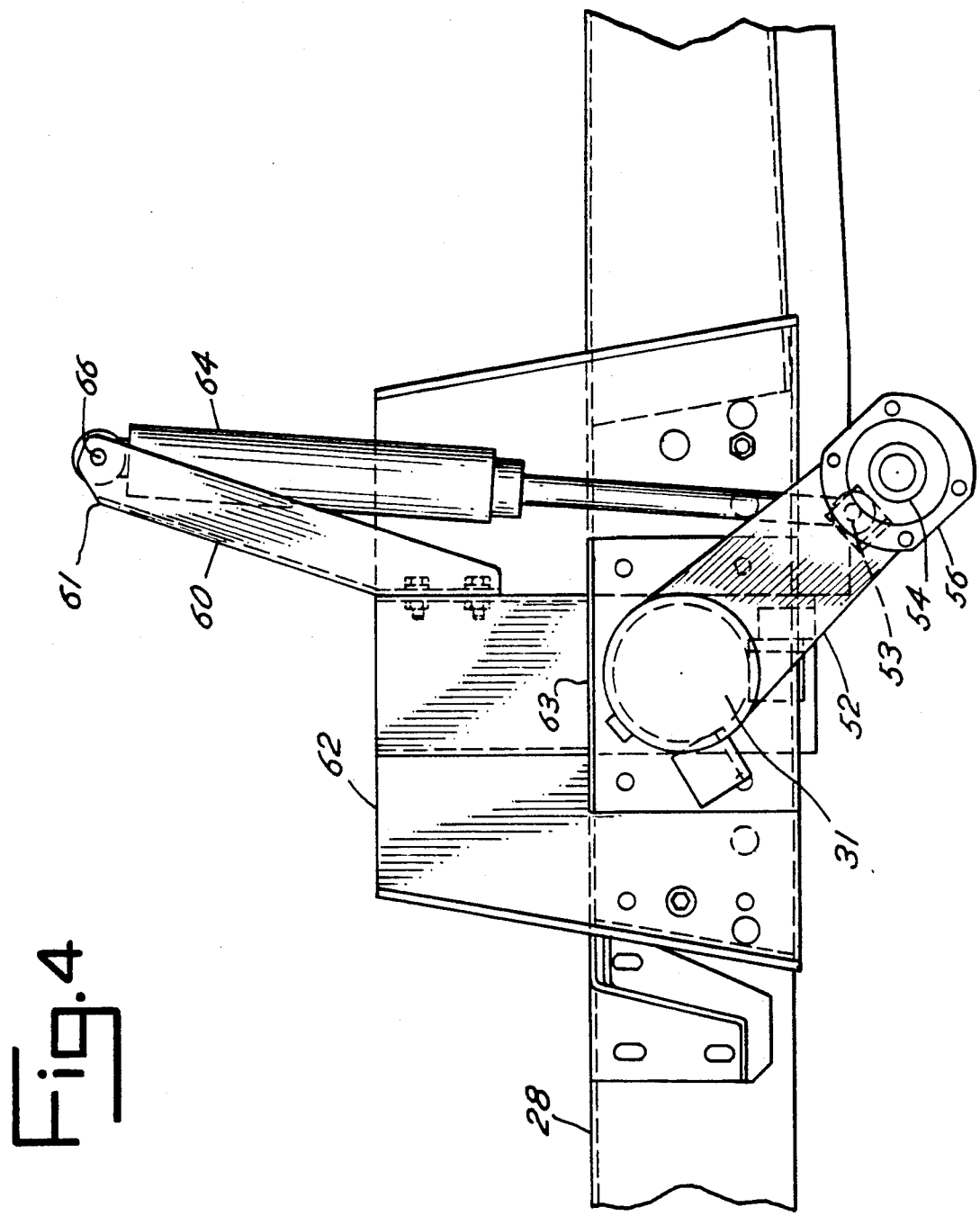

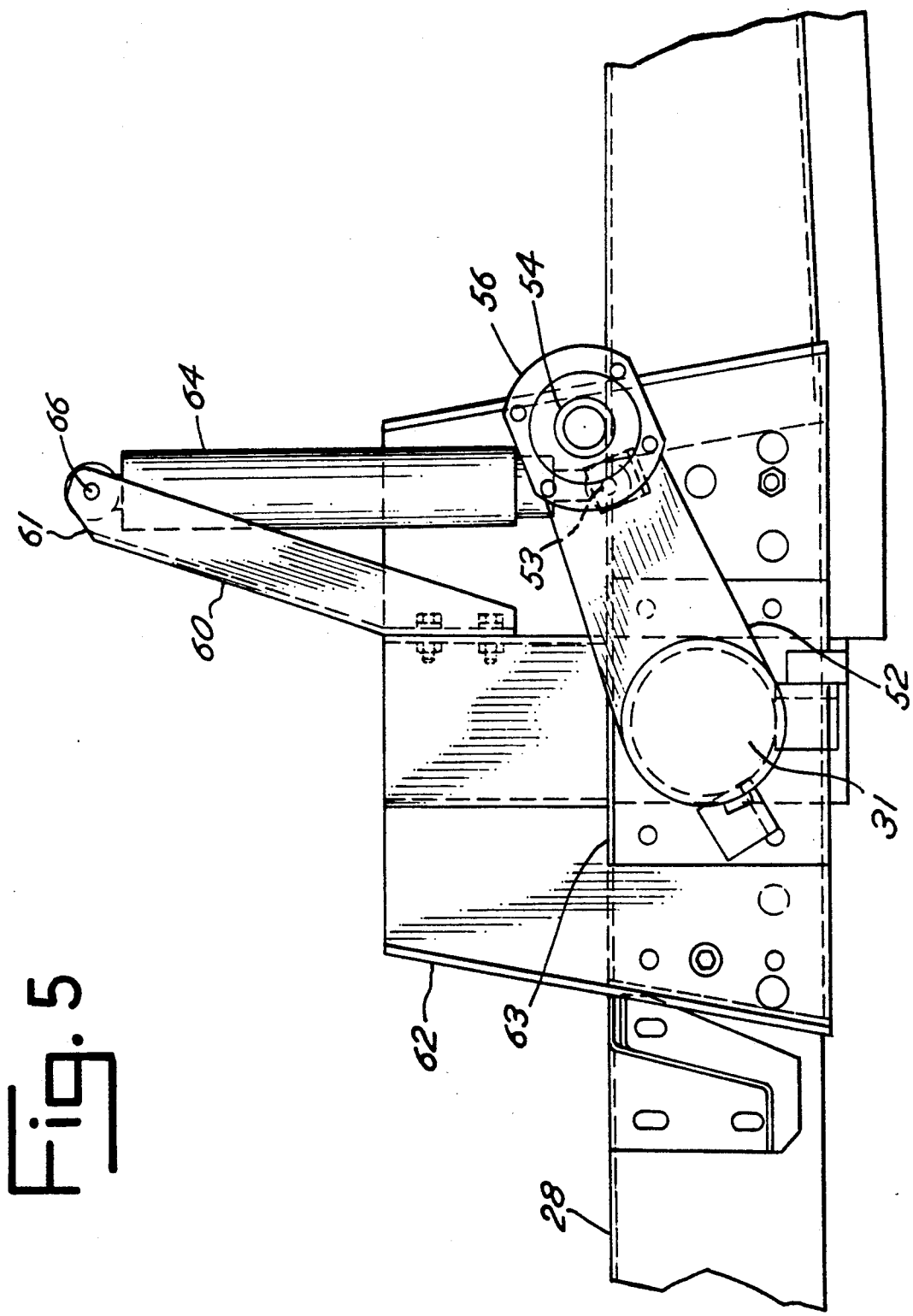

RECREATIONAL VEHICLE FRAME

FIELD OF THE INVENTION

This invention relates to a vehicle frame and has specific relevance to a drop frame for a recreational vehicle having vertical shock towers.

BACKGROUND OF THE INVENTION

Heretofore frames used for recreational vehicles generally are of a mono level construction wherein the front of the vehicle frame is generally on the same level as the rear portion of the frame. This type of vehicle body built on such a frame will take on a box-like shape to achieve the internal head clearance required. Shock absorber towers on such frames are typically angled with respect to vehicle such that the interconnecting shock absorbers are oriented at around 45 degrees with respect to vertical. This angled orientation of the shock absorber limits the effectiveness of the shock absorber causing a rougher ride.

SUMMARY OF THE INVENTION

The vehicle frame of this invention eliminates the problems above by providing a dropped rear portion of the frame and by using substantially vertical shock towers. The drop frame permits a recreational vehicle designer to achieve a traditional interior body height with an aerodynamic low profile outer appearance. The use of substantially vertical shock towers with the frame orients a connected shock absorber substantially vertical under a no load condition. When fully loaded, the shock absorber is only angled relative to the vertical approximately 2° degrees. The essentially vertical orientation of the shock tower and shock absorber thereof increases the effectiveness of the shock absorber to provide a smoother ride for the recreational vehicle.

Accordingly, it is an object of this invention to provide for a novel drop frame for a recreational vehicle.

Another object of the invention is to provide for a novel frame for a recreational vehicle having substantially vertical shock towers.

Other objects of this invention will become apparent upon a reading of the following description taken with the accompanying drawings.

BRIEF DESCRIPTION OF THE DRAWINGS

FIG. 2 is a top elevational view of the invention.

FIG. 3 is a right side elevational view of the invention.

FIG. 4 is an enlarged view of the shock tower of the invention including its support brackets with the shock absorber and pivot arm connected and in a no-load position.

FIG. 5 is the view of FIG. 4 with the shock absorber and pivot arm in a full loaded position.

DESCRIPTION OF THE PREFERRED EMBODIMENT

Figure 1:
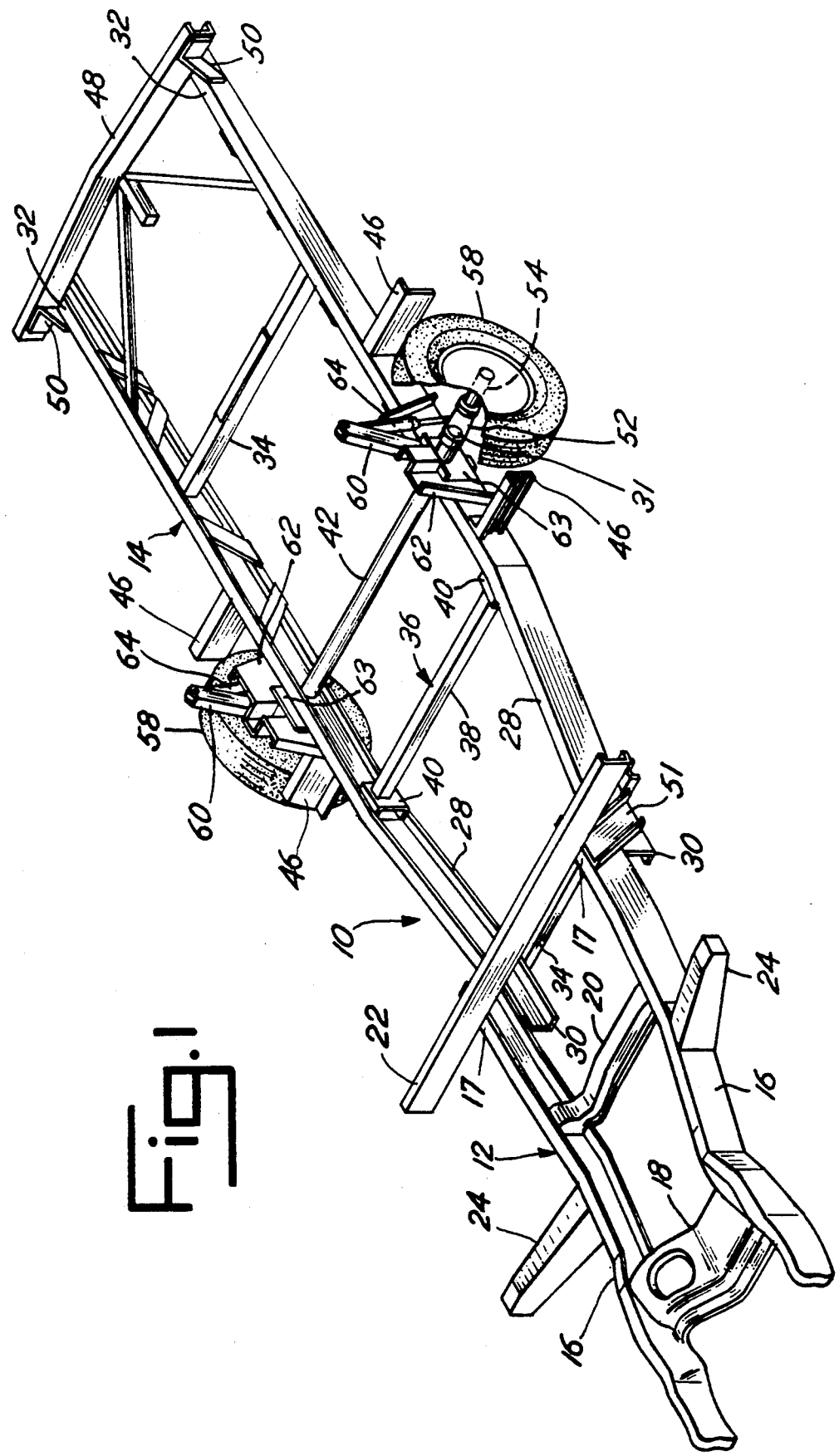
FIG. 1 is a perspective view of the vehicle frame of this invention.

The preferred embodiment herein described is not intended to be exhaustive or to limit the application to the precise form disclosed. Rather it is chosen and described in order to explain the invention so that others skilled in the art may utilize its teachings.

Vehicle frame 10, as illustrated in the figures, includes a front section 12 and a rear section 14. Frame front section 12 includes a pair of side rails 16 bent as illustrated and interconnected by a transverse motor support 18 and cross member 20. In the preferred embodiment, side rails 16 are C-shape in cross section. Supports 24 extend outwardly from each side rail 16. Cross member 22 extends across and is connected to the aft end 17 of side rails 16. The upper surfaces of cross member 22 and support brackets 24 are substantially within the same plane for supporting the cab portion, not shown, of a vehicle body also not shown.

Frame rear section 14 includes a pair of spaced side rails 28 each having a fore end 30 and an aft end 32. Side rails 28 are interconnected by a pair of C-channel cross members 34 and a cross member assembly 36. Cross member assembly 36 includes a tubular cross member 38 having C-shaped connecting brackets 40 welded to each end of the cross member. Brackets 40 are connected to side rails 28. A rear axle tube 42 is connected between and extends through side rails 28 to support a torsion bar 31. Bar 31 extends through tube 42 in free rotational orientation and constitutes the vehicle's rear axle. A series of body supports 46 are connected to the side rails and extend outwardly therefrom as illustrated. A bumper and hitch assembly 48 is connected across the aft end 32 of the side rails by angle braces 50. The force end 30 of side rails 28 are positioned under the aft ends 17 of side rails 16 and underlie side rails 16 as illustrated. The overlapping ends of side rails 16, 28 are connected to one another by C-channel braces 51.

The torsion bar 31 carried by axle tube 42 extends outwardly from each side rail 28. Torsion bar 31 is suitably anchored to tube 42 near its center in a manner common in the industry. A pivot arm 52 is connected to each protruding end of the torsion bar. A wheel axle 54 is connected to the free end of each pivot arm 52 and includes a plate 56. A wheel 58 shown in FIG. 1 is connected to a drum and backing plate (not shown). The backing plate is connected to plate 56 as is common in the industry. A shock absorber connecting bolt 53 is threaded into and extends from each pivot arm 52 toward side rail 28. Each bolt 53 is located near an axle 54 between the axle and the torsion bar 31.

A shock tower 60 extends above each side rail 28 above pivot arm 52 and is connected to the side rails by brackets 62, 63. As illustrated, each shock tower 60 is angled upwardly and rearwardly and has an upper end 61 which is located generally vertically over the underlying axle 54. A shock absorber 64 is pivotally connected at one end (the cylinder in the illustrative embodiment) to the upper end 61 of shock tower 60 between the side walls of the shock tower by a pin 66. The other end (the rod in the illustrative embodiment) of shock absorber 64 is pivotally connected to the lower end of the pivot arm bolt 53.

Shock absorber 64 is slightly offset from the vertical in the no-load position of FIG. 4 and is rotated about pin 66 approximately 6° degrees from its no-load position into its fully loaded position of FIG. 5. The substantially vertical orientation of the shock absorber allows the absorber to work more efficiently by aligning longitudinal axis of the shock absorber with the forces applied to it.

It should be understood that the invention is not to be limited to the precise form disclosed but may be modified within the scope of the appended claims.

We claim:

1. A frame for a recreational vehicle, said frame comprising a front section and a rear section supported by wheels, said front section having a pair of spaced side rails interconnected by cross members, said front sections spaced side rails each having a rearward end, said rear section also including a pair of spaced side rails interconnected by cross members, said rear section side rails each having a forward end, said rearward ends of the front section side rails overlying said forward ends of the rear section side rails, said front and rear section side rails being interconnected at their overlying ends by a plurality of braces connecting said side rails at their overlying locations, wherein said rear section side rails carries an axle assembly, said axle assembly including a pair of pivot arms each interconnected at one end to a torsion bar supporting a said side rail, one of said pivot arms positioned on each side of said frame adjacent a said side rail, each pivot arm carrying an axle at its other end, a vehicle wheel mounted upon each axle, a shock tower located above and over a said axle, a shock absorber connected between said upper end of each shock tower and a said pivot arm adjacent said axle carried by the pivot arm, each pivot arm being pivotal between a down no-load and an up fully loaded position in which said shock absorber connected to the pivot arm is maintained in a substantially vertical orientation.

2. A frame for a recreational vehicle, said frame comprising spaced side rails supported by wheels and interconnected by cross members, said side rails carrying an axle assembly, said axle assembly including a pair of pivot arms each interconnected at one end to a torsion bar supporting a said side rail, one of said pivot arms positioned on each side of said frame adjacent a said side rail, each pivot arm carrying an axle at its other end, a vehicle wheel mounted upon each axle, a shock tower carried by each side rail and terminating in an upper end located above and over a said axle, a shock absorber connected between said upper end of each shock tower and a said pivot arm adjacent said axle carried by the pivot arm, each pivot arm being pivotal between a down no-load and an up fully loaded position in which said shock absorber connected to the pivot arm is maintained in a substantially vertical orientation.

3. The frame of claim 2 wherein said torsion bar extends from one said side rail to the other said side rail, each pivot arm connected to an end of said torsion bar.

4. The frame of claim 3 and a tube connected between said side rails, said torsion bar extending through said tube, said tube including means for securing a portion of said torsion bar against rotation.

* * * * *